United States Patent
Woltmann et al.

(10) Patent No.: US 6,971,332 B2
(45) Date of Patent: Dec. 6, 2005

(54) BIRDCAGE ATTACHMENTS

(75) Inventors: Klaus Woltmann, Demarest, NJ (US); Jonathan Willinger, Tenafly, NJ (US)

(73) Assignee: JW Pet Company, Inc., Teterboro, NJ (US)

( * ) Notice: Subject to any disclaimer, the term of this patent is extended or adjusted under 35 U.S.C. 154(b) by 0 days.

(21) Appl. No.: 10/371,646

(22) Filed: Feb. 21, 2003

(65) Prior Publication Data

US 2003/0188696 A1    Oct. 9, 2003

Related U.S. Application Data

(60) Provisional application No. 60/370,200, filed on Apr. 5, 2002.

(51) Int. Cl.[7] .......................................... A01K 15/02
(52) U.S. Cl. ...................................... 119/467; 119/708
(58) Field of Search ........................ 119/467, 468, 702, 119/708, 537, 533, 705, 707; 446/69, 227, 446/228, 241

(56) References Cited

U.S. PATENT DOCUMENTS

| | | | |
|---|---|---|---|
| 804,907 A * | 11/1905 | Whitfield ................... 446/247 |
| 1,192,441 A * | 7/1916 | Lydecker .................... 119/468 |
| 1,632,380 A * | 6/1927 | Marcus ........................ 119/467 |
| 2,483,003 A * | 9/1949 | Fischer ........................ 119/468 |
| D167,326 S * | 7/1952 | Verosub et al. ............ D30/119 |
| 3,181,504 A * | 5/1965 | Stortz ......................... 119/708 |
| 3,815,282 A * | 6/1974 | Frost ............................ 446/69 |
| 3,911,866 A * | 10/1975 | Dodd .......................... 119/537 |
| 4,542,714 A * | 9/1985 | Ingraham et al. ........... 119/708 |
| 4,655,723 A * | 4/1987 | Marason et al. ............ 446/241 |
| 5,018,480 A * | 5/1991 | Goldman et al. .......... 119/468 |
| 5,022,345 A * | 6/1991 | Bolivar et al. ............. 119/708 |
| 6,374,772 B1 * | 4/2002 | Brandt ...................... 119/57.8 |
| 6,457,439 B1 * | 10/2002 | Engelking .................. 119/537 |

* cited by examiner

Primary Examiner—Son T. Nguyen
(74) Attorney, Agent, or Firm—Katten Muchin Rosenman LLP

(57) ABSTRACT

Birdcage attachments are mountable to a birdcage and present a bird with a variety of interesting and challenging activities. The toy attachments encourage birds to learn by experimenting. As a bird manipulates some parts of the toy attachments, the bird will discover that the parts may be put into different positions and remain there until deciding to move them again. In most cases, the parts will not automatically return to their original state or position if the bird stops playing, challenging a bird even more to return the toy to its original state.

12 Claims, 15 Drawing Sheets

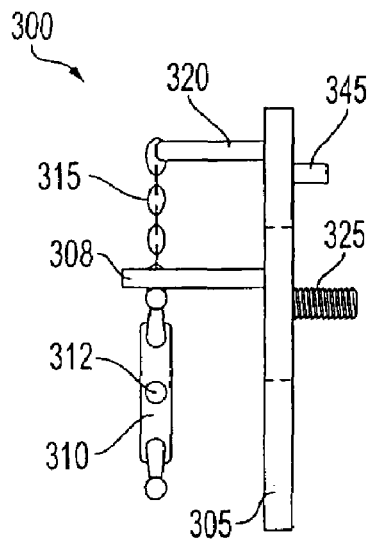
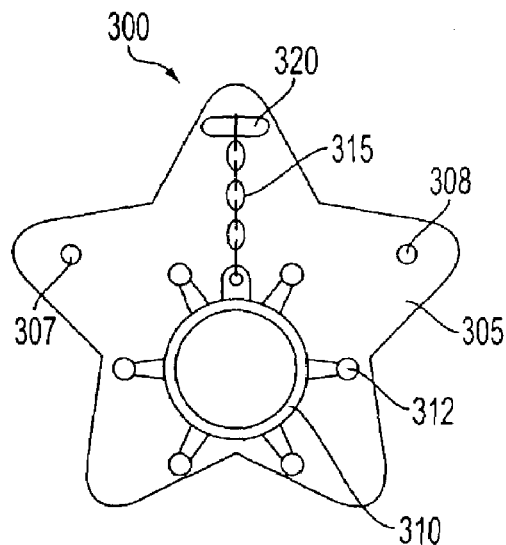
FIG. 16      FIG. 17
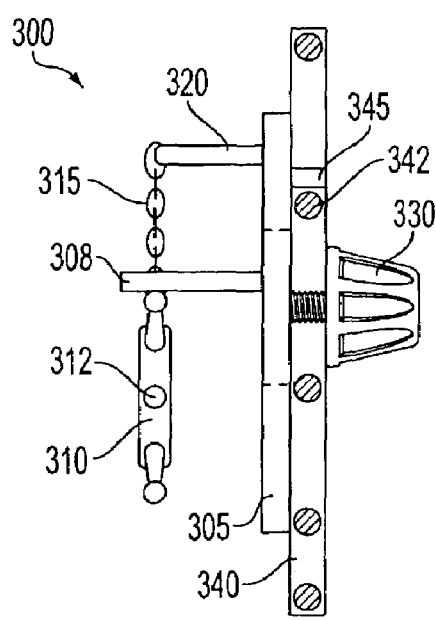
FIG. 18

BIRDCAGE ATTACHMENTS

CROSS REFERENCE TO RELATED APPLICATION

This application claims priority under 35 U.S.C. §119(e) from U.S. application Ser. No. 60/370,200 filed Apr. 5, 2002.

FIELD OF THE INVENTION

The present invention relates to birdcage attachments, and more particularly to birdcage toy attachments that challenge a bird's natural curiosity.

BACKGROUND OF THE INVENTION

Most of the birds kept as pets and sold in the pet trade as companion birds belong to the Psittacine family of birds. The family includes the most popular bird, the parakeet, also called budgerigar or simply budgie, as well as lovebirds, cockatiels and parrots. These birds are highly inquisitive, agile, manipulative and easily trained. Being confined in cages, they are often perceived as suffering from boredom unless provided with some objects that arouse their interest.

Many so-called toys are being sold to keep these birds busy, but few of the toys seem to really challenge the bird's natural curiosity. Most toys are made for either chewing or climbing—certainly activities which these birds should engage in—but are not necessarily challenging to the bird's inquisitive mind. Other toys can merely be set swinging or turning if the bird simply pecks at them and will return to their original state or position once the bird loses interest.

SUMMARY OF THE INVENTION

The birdcage attachments of the present invention encourage birds to learn by experimenting. As the bird manipulates some parts of the toys, the bird will discover that the parts may be put into different positions and remain there until deciding to move them again. In most cases, the toys of the present invention will not automatically return to their original state or position if the bird stops playing.

BRIEF DESCRIPTION OF THE DRAWINGS

FIG. 16 illustrates an alternative embodiment of a birdcage attachment of the present invention.

FIG. 17 is a front view of the attachment of FIG. 16.

FIG. 18 is a side view of the attachment of FIG. 16 shown attached to a birdcage wall.

DETAILED DESCRIPTION OF THE PREFERRED EMBODIMENTS

Figure 1:
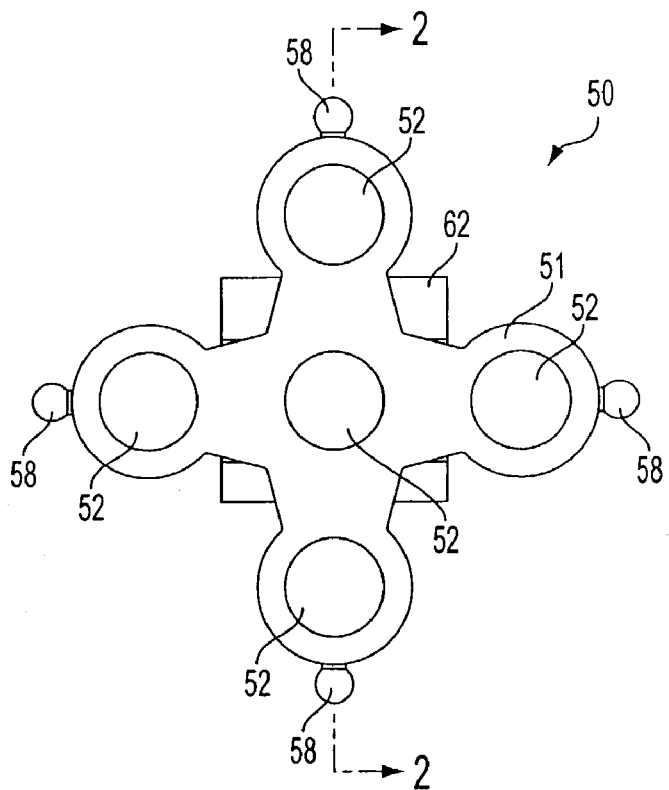
FIG. 1 is a front view of one embodiment of a birdcage attachment of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 2:
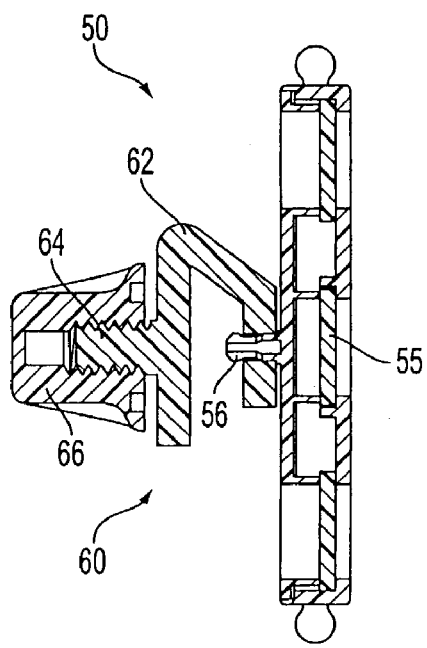
FIG. 2 is a cross section taken along line 2—2 of FIG. 1.
Figure 3:
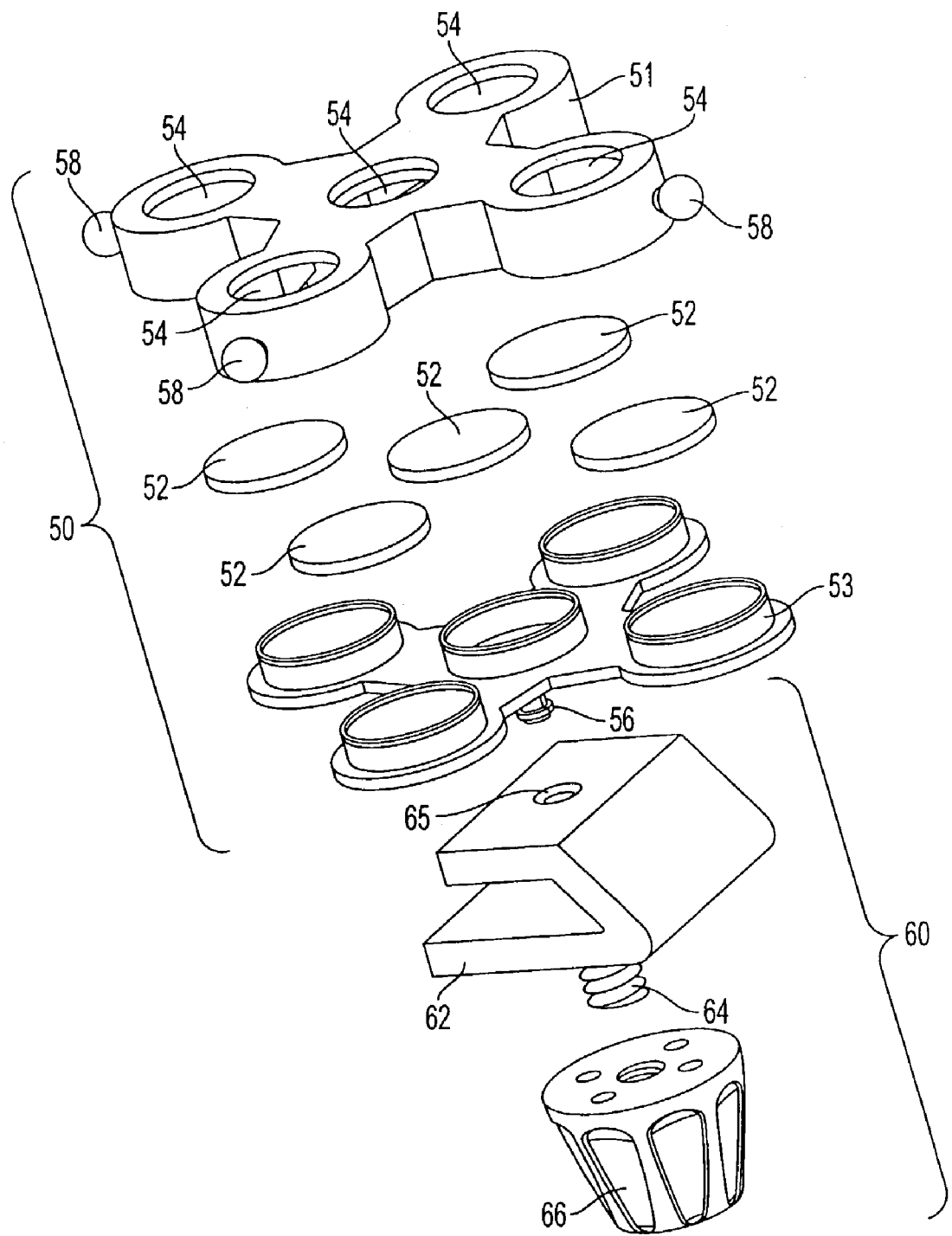
FIG. 3 is an exploded view of the birdcage attachment of FIGS. 1 and 2.

FIGS. 1–3 illustrate one embodiment of a birdcage attachment 50 of the present invention. For purposes of explanation, certain birdcage attachments of the invention will be described as educational "toys," although it will be understood that the use of the term "toy" is not to be interpreted in any limiting sense.

The toys of the present invention are all preferably mounted on small variously shaped, plates 62 which will be attached to the inside of a birdcage. The plates are preferably non-opaque (i.e., transparent or translucent) and may be colored so that the view of a bird through the cage wall and through the plate is not obstructed by the plate. An example of such an attaching mechanism 60 is shown in connection with the toy of FIGS. 1–3. The majority of inexpensive prior art bird items use a graduated, snap-on pressure fit and tends to bend the bars of the cage and also disturb the bird when put into place. It is also less secure than the screw attachment means 60 illustrated in the appended drawings. Prior art accessories with "snap-on" mechanisms are always difficult to manipulate. With one hand one must hold the cage steady and with the other push on or pull off the accessory. This process always frightens birds since the cage shakes and rattles excessively, putting especially newly acquired birds under serious stress. This is most troublesome with feeders and waterers which must be removed and re-mounted regularly for cleaning and refilling. The present attachments (toys, waterers, feeders, etc.) utilize screw and nut assemblies 60, and can be cleaned and refilled without having to remove the entire unit from the cage.

The attachment means 60 of FIGS. 1–3, for example, comprises a plate 62 with a screw fastener 64 integrally formed or embedded therein, and a threaded cap 66 that engages the fastener 64. The fastener 64 is preferably integrally formed into said plate 62 either by co-molding said fastener 64 with said plate 62, or by embedding the fastener 64 into said plate 62. Alternatively, the fastener and plate could be produced in a single mold. Alternatively, the fastener could be snapped into engagement with the plate. Other attachment means are clearly contemplated. In either case, the fastener 64 becomes effectively irremovable from or through the plate 62. Alternatively, the fastener may be press-fit through the plate. Other means of attaching the fastener to the plate are contemplated. The nut or cap 66 is engageable with the fastener 64 to secure the toy 50 to a birdcage wall (not shown). The fastener 64 is dimensioned to extend through an opening in the bars of a birdcage wall such that the plate 62 lies adjacent an inner side of the birdcage wall and is preferably wide enough to bridge the bars surrounding the opening, while the cap 66 is adapted to engage said fastener 64 on an outer side of the birdcage wall for securely clamping said toy 50 to said birdcage wall, the width of the cap face also preferably bridging the bars surrounding the opening.

The toy 50 of FIGS. 1–3 is rotatable around a central axis 55 and further comprises a series of discs 52 provided at spaced-apart intervals and secured between first and second lower housings 51, 53 respectively. Each of the discs 52 may be colored, clear or comprise mirrors embedded inside the openings 54, which presents a unique visual stimulus for a bird. Some or all of the openings 54 may also be empty, which may be further intriguing for a bird. An expandable pin 56 provided on the second housing 53 is press-inserted into an opening 65 in the plate 62 for attachment thereto. The housings 51, 53 are rotatable around axis 55 relative to the mounting plate 62. Knobs or protrusions 58 provided on one of the housings 51 may be provided for gripping by a bird to assist a bird in rotating the toy 50.

Figure 4:
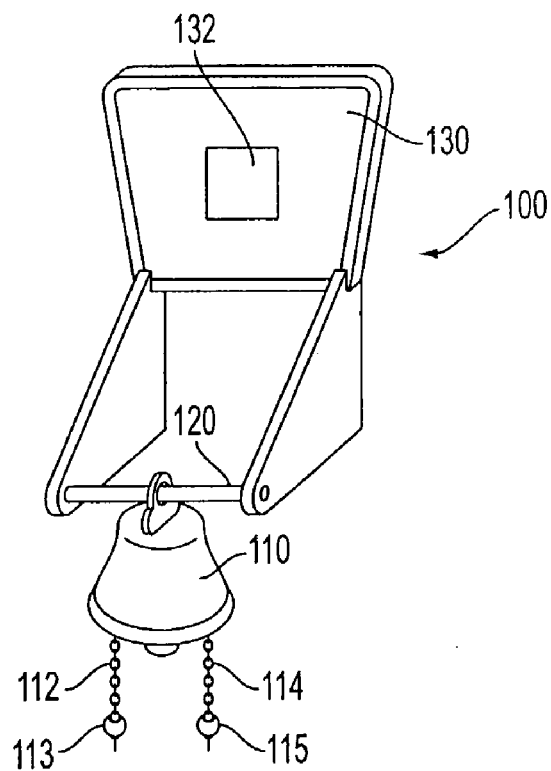
FIG. 4 illustrates an alternate embodiment of a birdcage attachment of the invention.
Figure 5:
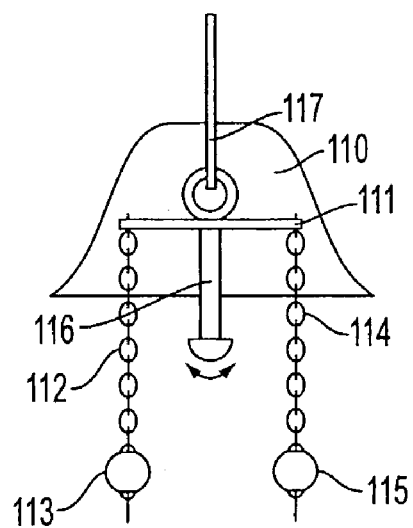
FIG. 5 illustrates the activating mechanism of the birdcage attachment of FIG. 4.
Figure 7:
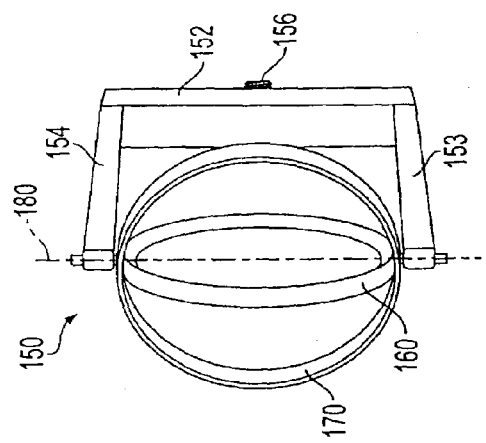
FIG. 7 illustrates the inner and outer ring of the embodiment of FIG. 6 displaced with respect to each other.
Figure 9:
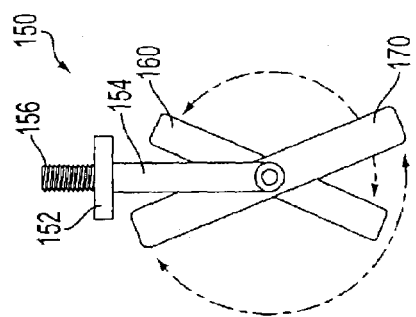
FIGS. 8 and 9 are top views illustrating the inner and outer ring of the embodiment of FIG. 6 displaced with respect to each other.
Figure 6:
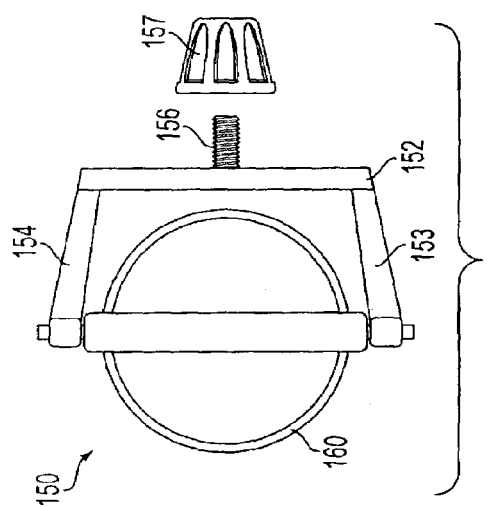
FIG. 6 illustrates a side view of an alternate embodiment of a birdcage attachment of the present invention.
Figure 8:
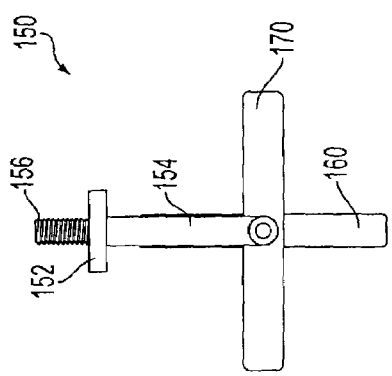

FIGS. 4 and 5 illustrate an alternative attachment 100 incorporating a bell 110. Practically every toy on the market has a small bell incorporated in it. In order to make the prior art bell ring, the bird simply pecks at it. The bell toy 100 of the present invention comprises a bell 110 hanging from a bar 120 which is attached to a mounting plate 130. A means 132 for attaching the mounting plate to a birdcage can be incorporated into the attachment 100 as discussed above. The bell 110 is slidable along the bar 120. The toy 100 is placed inside a cage high enough above a perch (not shown) so that a bird cannot simply peck at the bell 110. Instead, a bird must pull on one of two chains 112, 114 attached between a bar 111 and through which is attached a striker 116 to cause the striker 116 to strike the inside of the bell 110. The striker 116 is suspended from the top 117 of the bell 110 and acts as a pivot point for the bar 111, which pivots in response to a pull on one of the chains 112, 114. Gripping members or balls 113, 115 provided on the ends of the chains 112, 114 assist a bird in tugging the chains 112, 114. Referring to FIG. 5, the chains 112, 114 are arranged relative to the bar 111 and striker 116 such that a downward force upon chain 112 results in the bar 111 pivoting in a counter-clockwise direction, the chain 114 moving in an upward motion and the striker 116 moving to the right and striking the inside of the bell 110. Similarly, a downward force upon chain 114 results in the bar 111 pivoting in a clockwise direction, the chain 112 moving in an upward motion and the striker 116 moving to the left and striking the inside of the bell 110. The counter-movement of one of the chains in response to a tug on the other chain and a resultant ringing of the bell presents a unique visual and audible arrangement for a bird.

FIGS. 6–9 illustrate a double ring toy 150 having a mirrored inner circle ring 160 and an open outer ring 170. The rings 160, 170 rotate with respect to each other about a central axis 180. The rings 160, 170 are secured to a mounting plate 152 by a pair of support arms 153, 154, and each ring is capable of rotating 360° around said axis 180 either in unison with the other ring or separate therefrom. A fastener 156 is secured to the mounting plate 152 as discussed above and is engageable with a cap 157 as discussed above for securing the mounting plate to a birdcage (not shown). The motion of the rings 160, 170 relative to each other and to the mounting plate 152 presents a unique visual experience for a bird.

Figure 10:
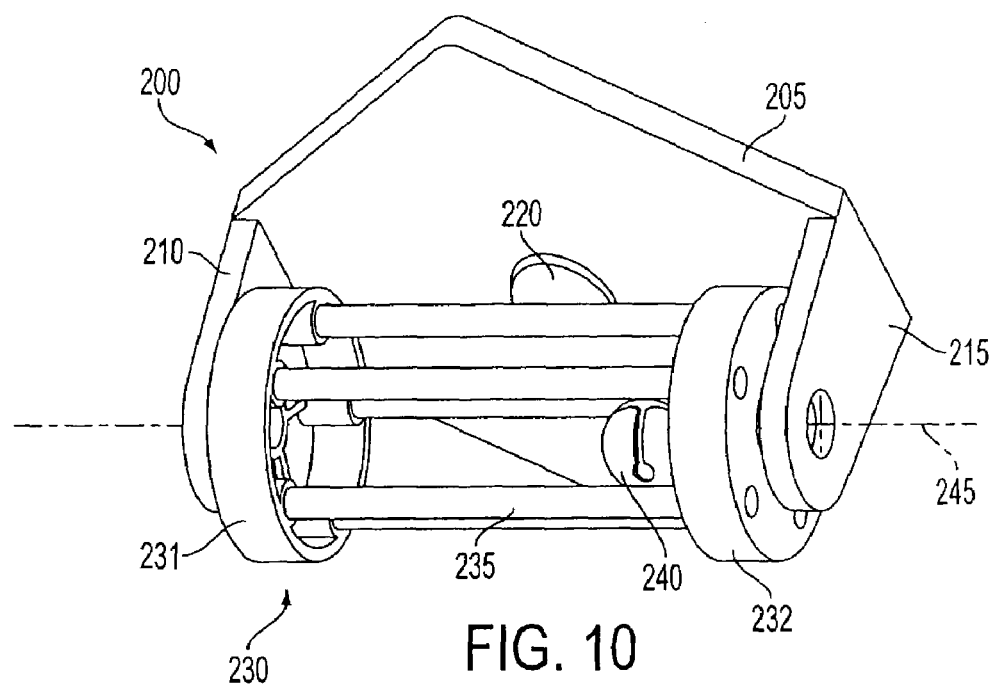
FIG. 10 illustrates an alternate embodiment of a birdcage attachment of the present invention.
Figure 11:
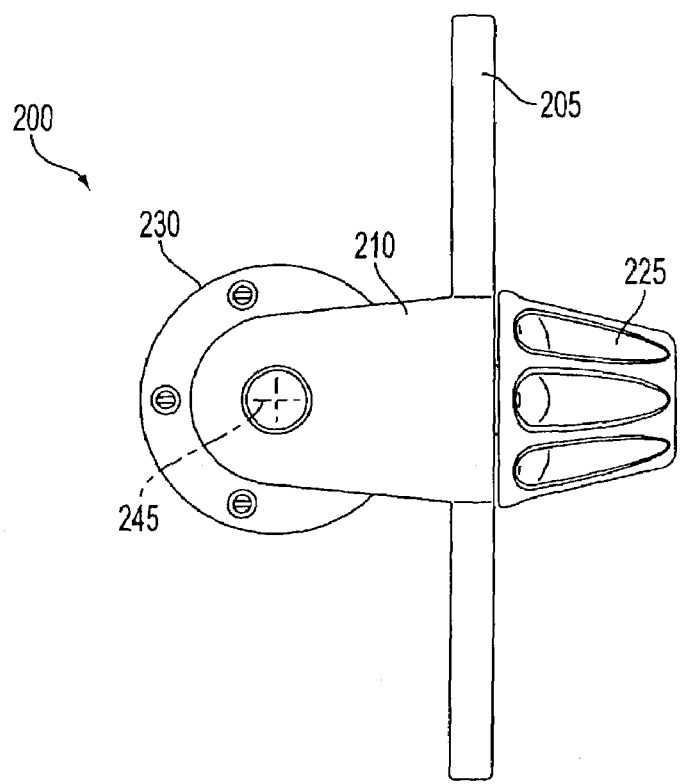
FIG. 11 is a top view of the birdcage attachment of FIG. 10.
Figure 12:
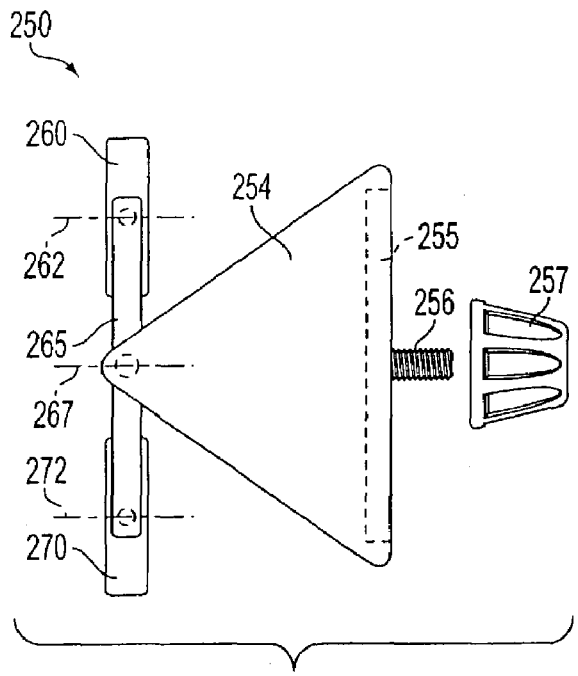
FIG. 12 illustrates an alternative embodiment of a birdcage attachment of the present invention.
Figure 13:
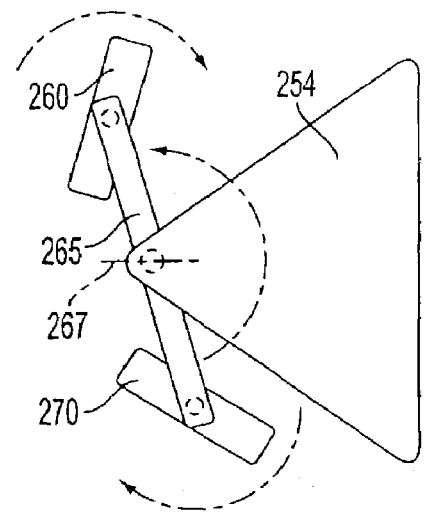
FIG. 13 is a partial side view of the birdcage attachment of FIG. 12.
Figure 14:
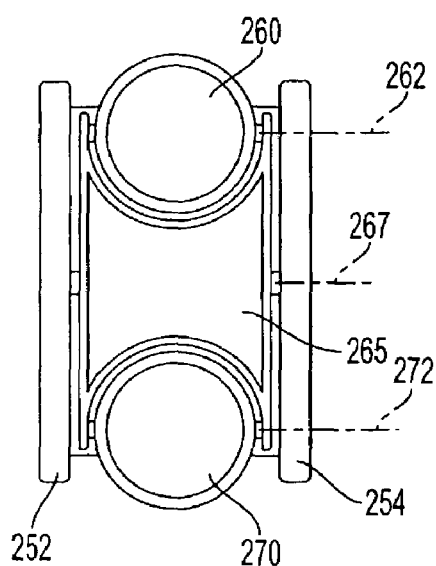
FIG. 14 is a front view of the birdcage attachment of FIG. 12.
Figure 15:
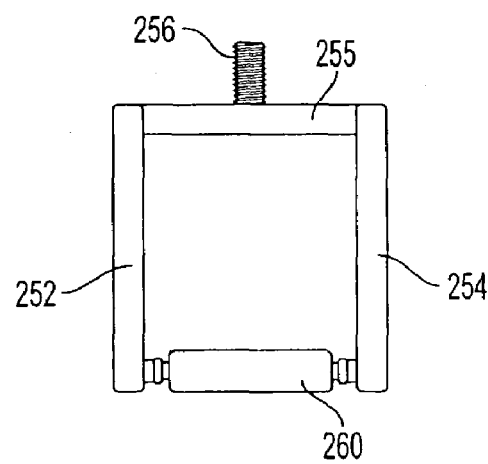
FIG. 15 is a partial top view of the birdcage attachment of FIG. 12.

FIGS. 10 and 11 illustrate a revolving drum toy 200 comprising a mounting plate 205, a pair of support arms 210, 215, a fastener 220, a cap 225 and a drum 230 rotatable between the support arms 210, 215. The drum 230 comprises a hollow cylinder bounded by a plurality of spaced apart bars 235 (bounded by the end plates 231, 232) of the drum 230 that retain a sounding means 240 inside the drum 230. The bars 235 may be clear, the same color or multi-colored. The sounding means 240 may be a bell or some other object that creates a sound when moved, which sounding means may rotate and slide within the interior of the drum 230. The drum 230 is rotatable about a central axis 245. The motion of the drum 230 and bars 235 and the sound created by the sounding means 240 presents a unique visual and aural experience for a bird.

FIGS. 12–15 illustrate a tilt a wheel device 250 having a plurality of heads 260, 270 that are each individually rotatable around its own central axis 262, 272 and are connected to each other by an arm 265 that is also rotatable about a central axis 267. Each of the heads 260, 270 can have mirrored sides to increase the enjoyment to the animal. The heads 260, 270 can be decorated with something other than mirrors as desired. The arm 265 is attached between a pair of support members 252, 254, which are attached to a mounting plate 255 having a fastener 256 that is engageable with a cap 257 as described above. The arm 265 and the heads 260, 270 are rotatable individually or in unison relative to the mounting plate 255. The rotating motion of the arm 265 about its central axis 267 and the heads 260, 270 about their axes 262, 272 and relative to each other and to the mounting plate 255 presents a unique visual experience for a bird.

FIGS. 16–18 illustrate a star ring toss toy 300 birdcage attachment of the present invention. In front of a star-shaped (other shapes are contemplated) mounting plate 305, a ring (other shapes are contemplated) 310 hangs suspended on a chain 315 from a support arm 320. A fastener 325 extends outwardly from the mounting plate 305 and is engageable with a cap 330 as discussed above for clamping the mounting plate 305 to a birdcage wall 340. A locator post 345 may be provided on the rear of the mounting plate 305 for locating the mounting plate 305 relative to the bars 342 in the birdcage wall 340. While illustrated initially in the embodiment of FIGS. 16–18, such locator post may be on any of the embodiments described herein. On the outer periphery of the ring 310, there are preferably six equally spaced short "spokes" 312 which help a bird hold the ring 310 in different positions. A bird can manipulate the ring 310 and has a choice of placing it on either one of two pegs 307, 308 (other number of pegs are contemplated) positioned on the right and left of the back plate 305 relative to the support arm 320, or on the support arm 320 if desired. The pegs 307, 308 may be placed anywhere on the mounting plate 305 relative to the support arm 320 and present a unique interactive experience to a bird wishing to attach and remove the ring 310 from the pegs 307, 308.

Figure 19:
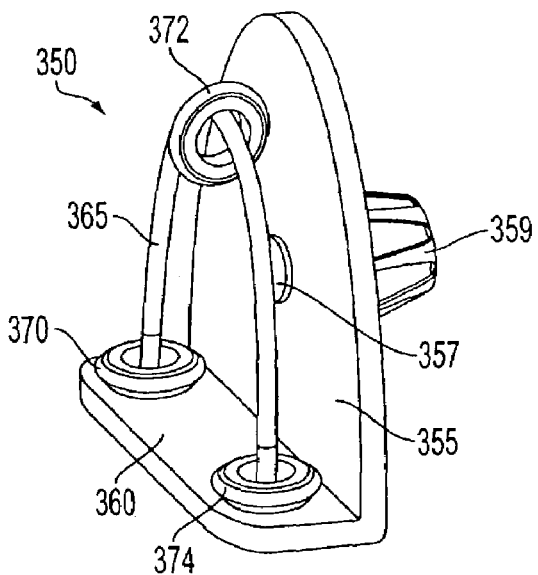
FIG. 19 illustrates an alternative embodiment of a birdcage attachment of the present invention.
Figure 20:
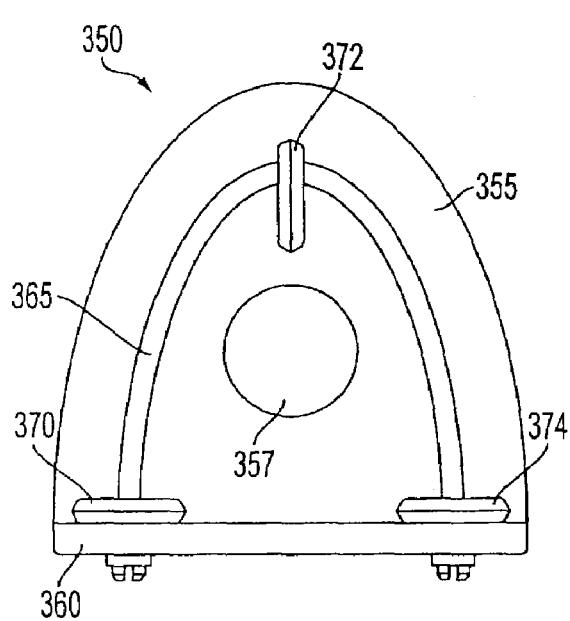
FIG. 20 is a front view of the attachment of FIG. 19.
Figure 21:
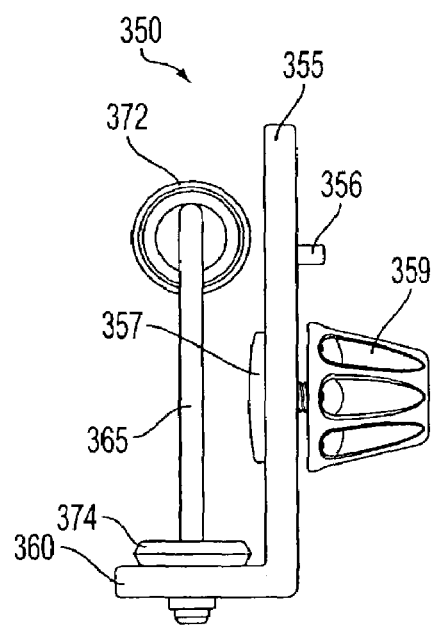
FIG. 21 is a side view of the attachment of FIG. 19.

FIGS. 19–21 illustrate a leap frog toy 350 of the present invention. A mounting plate 355 is provided with a support ledge 360 to which is attached an arcuate rod 365. A fastener 357 is attached to the plate 355 and is engageable with a cap 359 as discussed above, and a locator pin 356 may be provided on the rear of the mounting plate 355 for locating the toy 350 relative to a birdcage wall. The plate 355 and rod 365 may have the same arcuate shape as illustrated, or the shapes may be different as desired. A plurality of preferably colorful rings 370, 372, 374 are placed on the rod 365 which a bird can move, either one at a time or in groups, from one side, up over the top of the rod 365 to the other side, and back. While such rings are illustrated as annular in design, other shapes may be used. Also, other shapes for the rod 365 are contemplated.

Figure 22:
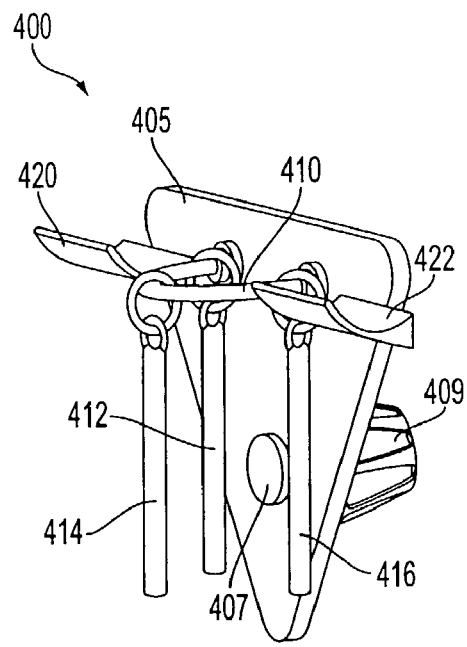
FIG. 22 illustrates an alternative embodiment of a birdcage attachment of the present invention.
Figure 23:
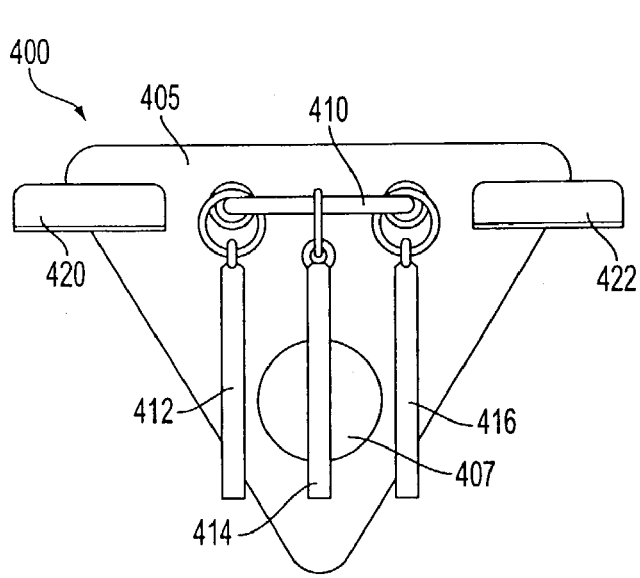
FIG. 23 is a front view of the attachment of FIG. 22.
Figure 24:
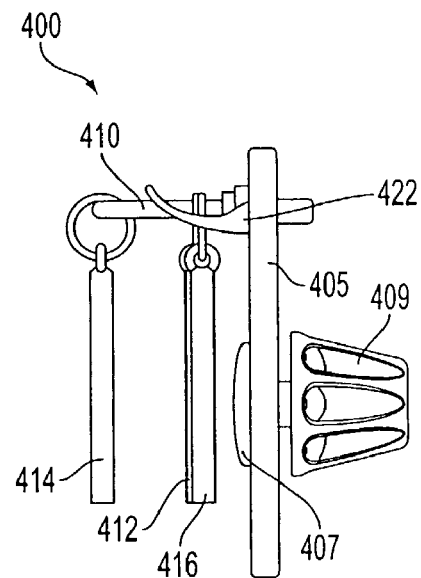
FIG. 24 is a side view of the attachment of FIG. 22.

FIGS. 22–24 illustrate a swinging batons toy 400 of the present invention. A mounting plate 405 is provided with an arcuate support 410 and a fastener 407 that is engageable with a cap 409 as discussed above. While the plate 405 may be triangular as illustrated, other shapes are contemplated. Three batons or rods 412, 414, 416 are suspended and hang vertically from the support 410. Such rods may be the same color, or multi-colored, or may comprise a different shape from that illustrated in FIGS. 22–24. A shelf or platform 420, 422 is provided on each side of the support 410 for receiving one or more rods thereon. A bird can move each rod along the support and place it horizontally on either shelf 420, 422. While a pair of shelves 420, 422 are illustrated, only one or more than two shelves may be provided as desired.

Figure 26:
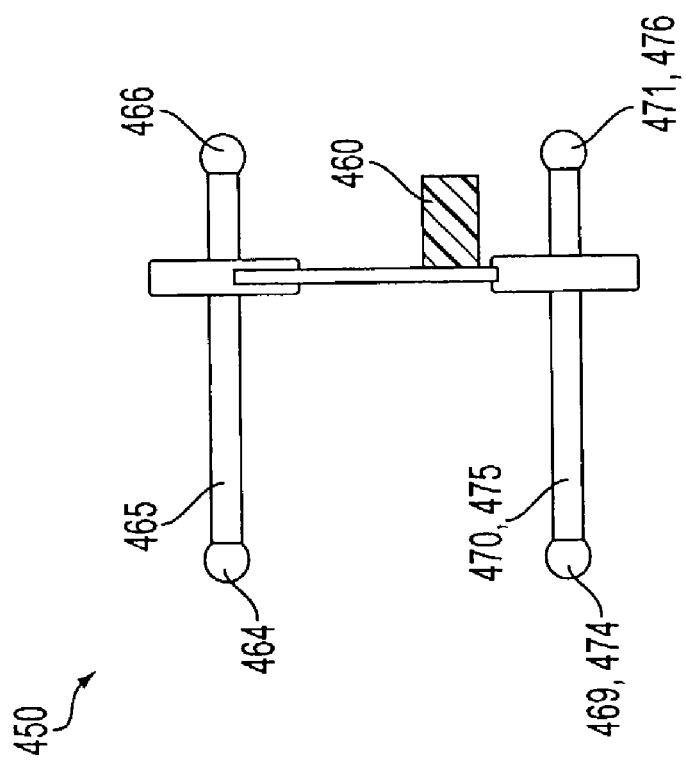
FIG. 26 is a side view of the attachment of FIG. 25.
Figure 25:
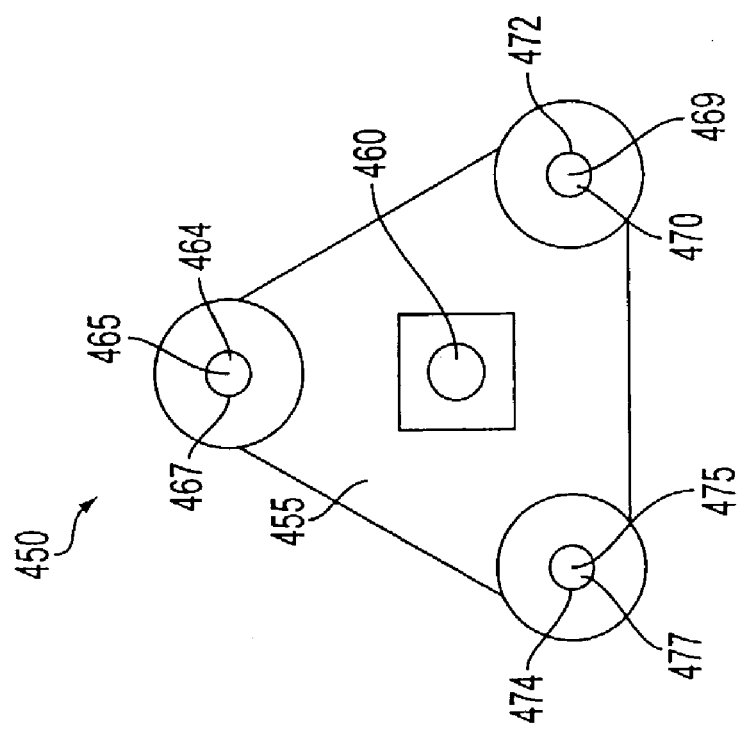
FIG. 25 illustrates an alternative embodiment of a birdcage attachment of the present invention.

FIGS. 25–26 illustrate a sliding peg toy 450 of the present invention. A mounting plate 455 is provided with a fastener 460 that is engageable with a cap (not shown) as discussed above. While the plate 455 may be triangular as illustrated, other shapes are contemplated. A plurality of rods 465, 470, 475 are mounted in openings 467, 472, 477 near the corners of the plate 455. While three rods are shown, at least one and more than two or three rods are contemplated. A bird can manipulate the rods 465, 470, 475 by pushing or pulling them back and forth relative to the mounting plate 455, with stops 464, 466, 469, 471, 474, 476 provided on the ends of the rods to prevent the rods from being separated from the mounting plate 455. The rods are dimensioned so that they are rotatable within the openings 467, 472, 477 and extend through openings (spaces between bars) in a birdcage wall.

Figure 27:
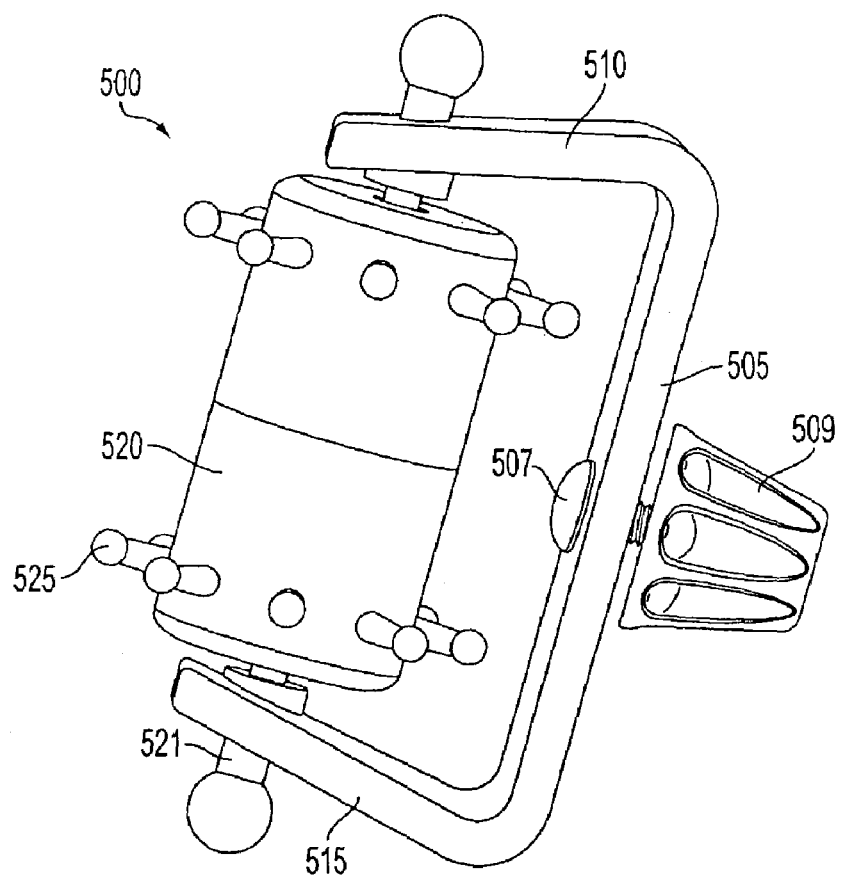
FIG. 27 illustrates an alternative embodiment of a birdcage attachment of the present invention.
Figure 28:
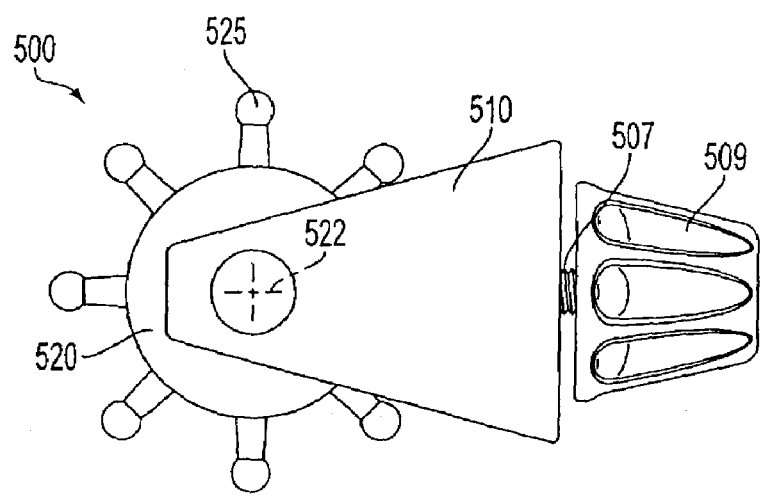
FIG. 28 is a top view of the attachment of FIG. 27.

FIGS. 27–28 illustrate a rotatable barrel device 500 of the present invention comprising a mounting plate 505 having a fastener 507 and cap 509 as discussed above. A pair of support arms 510, 515 are attached to the mounting plate 505 for connecting a rotatable barrel 520 therebetween along a support axle 521. The barrel 520 is rotatable along an axis 522 and is provided with a series of spikes 525 arranged around the outer periphery. The spikes 525 may be multi-colored and/or colored the same as the barrel 520 and may be disposed around the outer periphery of the barrel 520 in a variety of different arrangements.

Figure 29:
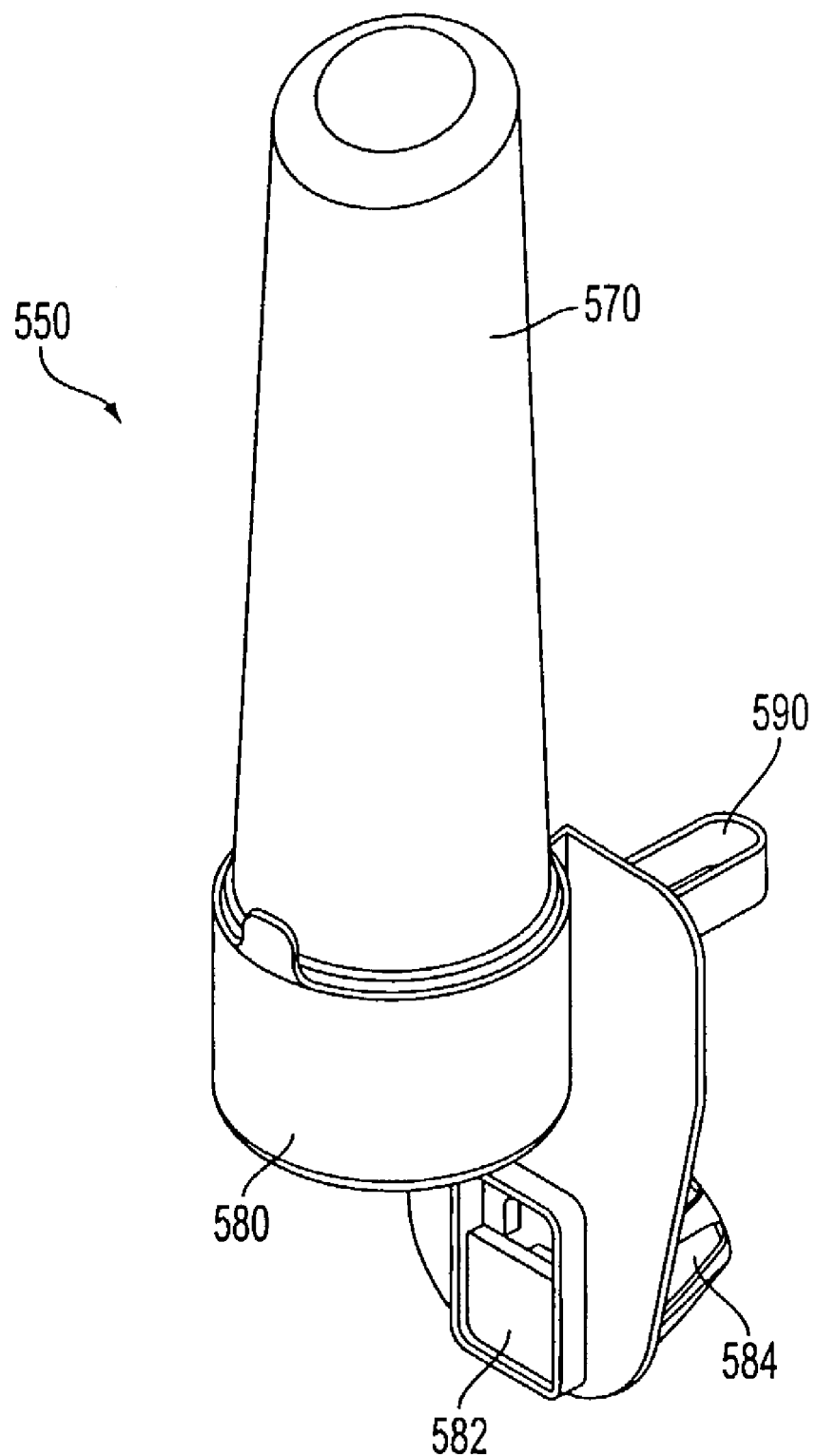
FIG. 29 illustrates an alternative embodiment of a birdcage attachment of the present invention.
Figure 30:
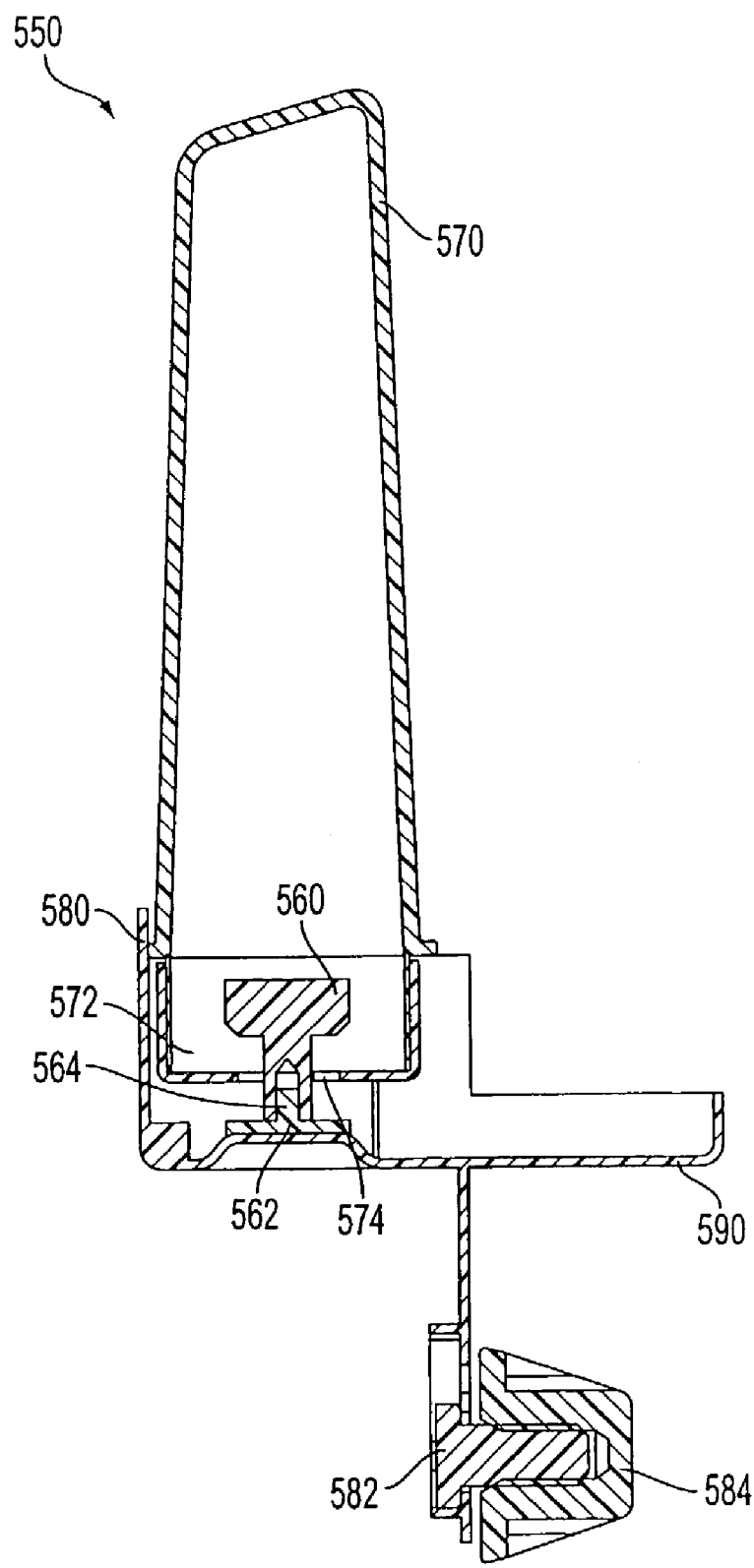
FIG. 30 is a cross-sectional view of the attachment of FIG. 29.

FIGS. 29 and 30 illustrate a watering device birdcage attachment 550 for caged birds, specifically a watering device that allows for an easy, non-spill application of water and minimal disturbance of a bird inside a birdcage. The attachment 550 utilizes a valve 560 so that water cannot leak when the device 550 is refilled with water. Prior art external waterers where the water is held in a container outside a cage are known. However, what is one of the unique features about the waterer 550 of the present invention is the non-leak valve 560 and the means 582, 584 of attaching the waterer 550 to a cage (not shown).

In the prior art, water is stored for the bird in a number of ways. First, water can be put in a cup that attaches to the inside of the cage bars. The problem with this method is that water often spills when filling the cup and placing it in the cage, water spills in the cage and the bird often splashes the water around the cage. Another method utilizes an external water chamber that rests on a holder having a small trough which extends into the cage and gives the bird access to the water. The water chamber is filled and the holder with trough is placed in inverted position onto the water chamber. The unit is then turned upside down and mounted on the cage. The entire unit must be removed from the cage for refilling of the water chamber.

With the device 550 of the present invention, a lid 570 is placed onto the water reservoir 572. The lid 570 has a small hole 574 which can be covered by a flat, round disk 562, serving as a valve 560. A short rod 564 projects from the center of the disk 562 and extends roughly one half inch through the hole 574 in the lid. Another disk at the end of the rod prevents the valve assembly from slipping out of the hole in the lid. The valve assembly can freely move up and down. A holder 580 for the water reservoir is attached to the outside of the cage via a fastener 582 and cap 584 as discussed above, and a narrow trough 590 extends through the bars into the inside of the cage. Contrary to prior art devices, the holder 580 never has to be detached from the cage when refilling the reservoir.

After the water reservoir is filled with water, the lid with valve is placed on the top to cover the reservoir. The reservoir can now be turned upside down. The valve, by its own gravity, will close the hole in the lid so that no water can leak out. The reservoir is then placed into the holder upside down. Before the reservoir comes to rest in its final position in the holder, the extended rod of the valve will reach the bottom of the holder, and as the reservoir reaches its lowest position, the valve will be pushed up and held in an open position to allow water to fill the holder and trough.

Figure 31:
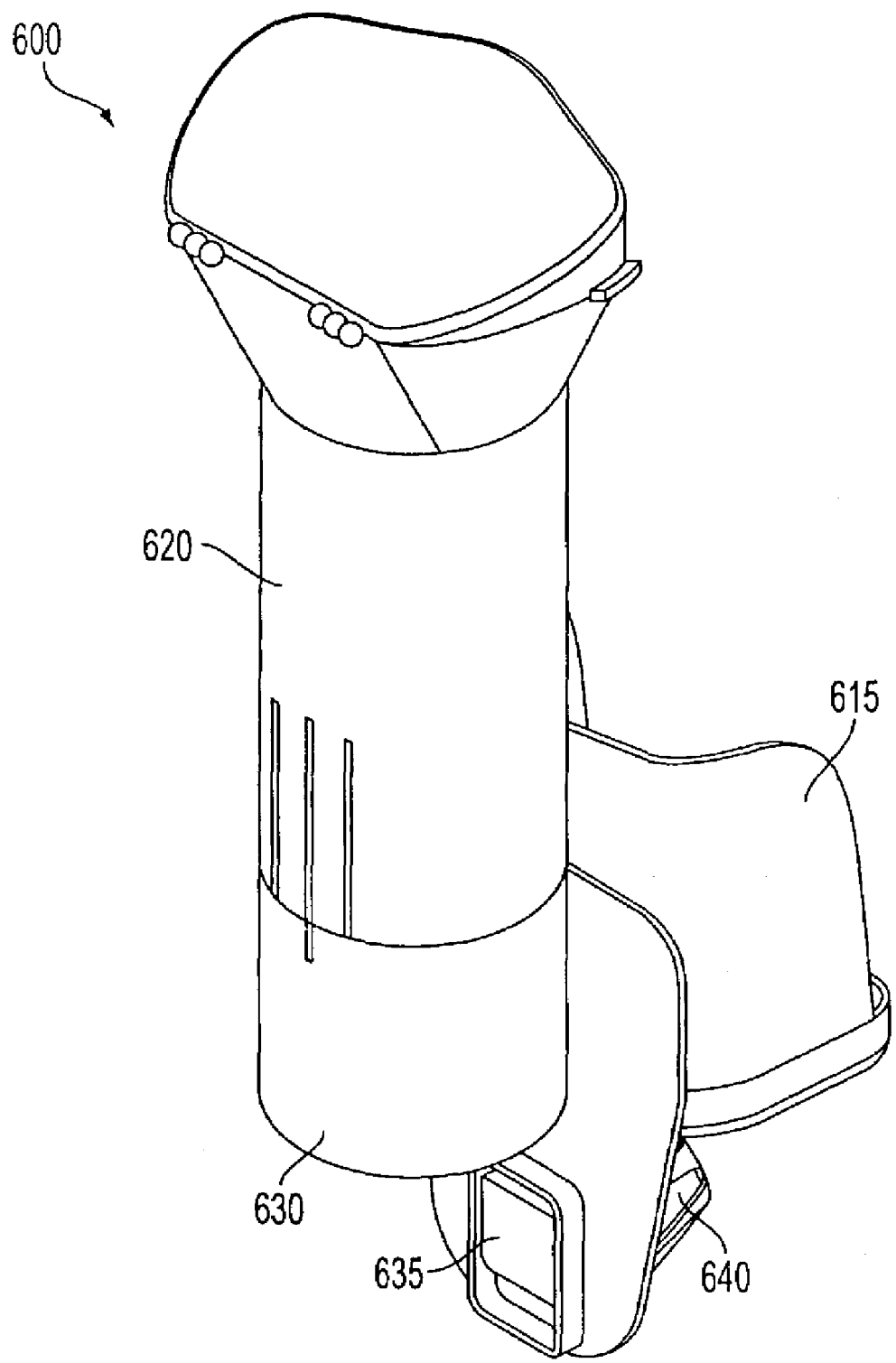
FIG. 31 illustrates an alternative embodiment of a birdcage attachment of the present invention.
Figure 32:
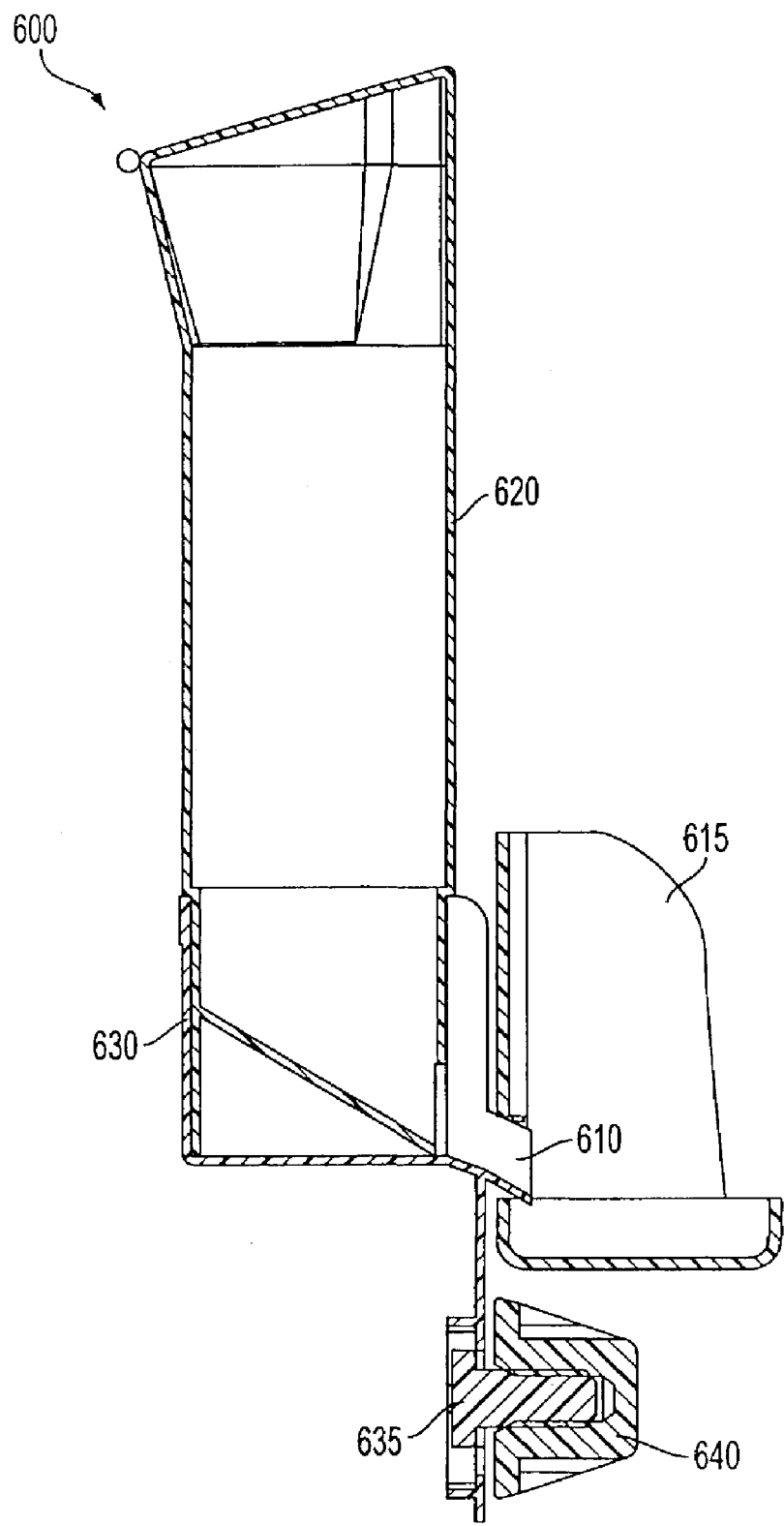
FIG. 32 is a cross-sectional view of the attachment of FIG. 31.

FIGS. 31 and 32 illustrate a feeder birdcage attachment 600 for parakeets and other small birds, which is an external gravity fed feeder. The unique aspect of the feeder 600 of the present invention is that the feeder 600 is outside the cage and relies on a chute 610 which feeds an internal cup 615 attached to the chute. As the reservoir 620 of this feeder 600 is open on top and mounted on the outside of the cage, it can be refilled most easily. The reservoir 620 is attached to a holder 630, which is provided with a fastener 635 that is engageable with a cap 640 for securing the feeder 600 to a cage as discussed above. The seed cup 615 is attached inside a cage and as the bird feeds, seeds are replenished via a chute 610 which connects the reservoir 620 and the seed cup 615 through the bars of the cage. The cup 615 is preferably very shallow, holding only 3 to 4 layers of seed. This ensures that seeds do not get buried under layers of empty seed shells and husks which accumulate as the bird feeds. This often happens in ordinary seed cups which tend to be deep. Bird keepers often discard large amounts of good seeds since it appears that the cups are filled with empty shells only.

The seed cup 615 has high rear and sidewalls acting as seed guards. Fewer seeds are scattered outside the cage by the birds feeding activity. The shape and downward curved side walls discourages birds to sit and rest on the edge of the cup, where they sometimes defecate into the cup, spoiling the seeds. The feeder also has an "on/off" mechanism which can shut off seed delivery to the cup, so that the cup can be removed for cleaning without having to remove the entire feeder from the cage.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

We claim:

1. A birdcage attachment comprising:
   a non-opaque mounting plate provided with means for mounting said mounting plate to a birdcage;
   support arms extending outwardly from said mounting plate and defining a support axis therebetween;
   a toy supported on at least two support locations by said support arms along said support axis, said toy being movable with respect to said support arms and said mounting plate; and
   wherein said toy further comprises a plurality of concentric components, each of said plurality of concentric components being rotatable with respect to each other about said support axis, and wherein at least one component is disposed within at least one other component so as to rotate within the at least one other component.

2. A birdcage attachment in accordance with claim 1, wherein said toy is movable in a direction that is perpendicular to said mounting plate.

3. A birdcage attachment in accordance with claim 1, wherein said toy is movable in a plane that is parallel to said mounting plate.

4. A birdcage attachment in accordance with claim 1, wherein one of said components is a ring.

5. A birdcage attachment in accordance with claim 4, wherein each component is a ring.

6. A birdcage attachment in accordance with claim 1, wherein one of said plurality of concentric components is a mirror.

7. A birdcage attachment in accordance with claim 1, wherein said mounting plate further comprises a positioner on a rear side thereof for positioning the birdcage attachment relative to a birdcage.

8. A birdcage attachment in accordance with claim 1, wherein each component is independently rotatable about said support axis.

9. A birdcage attachment in accordance with claim 1, wherein said support axis is defined through a diameter of one of said components.

10. A birdcage attachment in accordance with claim 1, wherein each component is a ring.

11. A birdcage attachment in accordance with claim 1, wherein at least one component is supported by at least one other component.

12. A birdcage attachment comprising:
    a mounting plate provided with means for mounting said mounting plate to a birdcage;
    support arms extending outwardly from said mounting plate and defining a support axis therebetween;
    a toy supported on at least two support locations by said support arms along said support axis, said toy being movable with respect to said support arms and said mounting plate; and
    wherein said toy further comprises a plurality of concentric components, each of said plurality of concentric components being rotatable with respect to each other about said support axis, and wherein at least one component is disposed within at least one other component so as to rotate within the at least one other component.

* * * * *